US006291542B1

(12) United States Patent
Hubbard et al.

(10) Patent No.: US 6,291,542 B1
(45) Date of Patent: Sep. 18, 2001

(54) METHOD AND APPARATUS FOR SELECTIVELY CURING A SHEET OF EPDM MATERIAL

(75) Inventors: Michael J. Hubbard, Holland; Walter J. Kelly, Wadsworth; Anthony Verrocchi, Akron; Raymond J. Weinert, Macedonia, all of OH (US)

(73) Assignee: Omnova Solutions Inc., Fairlawn, OH (US)

( * ) Notice: Subject to any disclaimer, the term of this patent is extended or adjusted under 35 U.S.C. 154(b) by 0 days.

(21) Appl. No.: 09/197,742

(22) Filed: Nov. 20, 1998

(51) Int. Cl.⁷ .................................. C08F 2/46; B32B 3/10
(52) U.S. Cl. ......................... 522/158; 522/150; 522/157; 522/161; 428/141; 428/147; 264/494
(58) Field of Search ..................... 522/157, 150, 522/158, 161, 149; 428/141, 142, 147; 264/494, 495, 496, 31

(56) References Cited

U.S. PATENT DOCUMENTS

| 4,458,128 | * | 7/1984 | Chabinsky | 219/10.55 R |
| 4,680,071 | * | 7/1987 | Candle | 156/218 |
| 4,803,020 |   | 2/1989 | Valaitis et al. | 264/22 |

* cited by examiner

Primary Examiner—James J. Seidleck
Assistant Examiner—Sanza McClendon
(74) Attorney, Agent, or Firm—Larry R. Meenan; Robert F. Rywalski

(57) ABSTRACT

A method and apparatus for selectively curing a sheet of ethylene-propylene diene termonomer (EPDM) material to form a roofing membrane for installation on a roof deck. The method includes the steps of providing a sheet formed of ethylene-propylene diene termonomer, the sheet having a field and longitudinal edge areas bordering the field; and then simultaneously shielding at least one edge area of the EPDM sheet and exposing at least the field to a source of radiation to cure at least the field of the EPDM sheet and provide a selectively cured EPDM roofing membrane. Also disclosed is the product formed by the method of the present invention.

8 Claims, 3 Drawing Sheets

METHOD AND APPARATUS FOR SELECTIVELY CURING A SHEET OF EPDM MATERIAL

FIELD OF THE INVENTION

This invention relates to a method and apparatus for selectively curing a sheet of ethylene-propylene diene termonomer (EPDM) material and the product formed thereby. More particularly, this invention relates to a method and apparatus for selectively curing at least the field portion of a sheet of EPDM material for use as a roofing, membrane and to a method of joining the roofing membranes and the product formed thereby.

BACKGROUND OF THE INVENTION

EPDM membranes are used as a single ply roofing material for industrial and commercial flat roofs. Such membranes are generally applied to the roof surface in a vulcanized or cured state. Because of outstanding weather resistance and flexibility, cured EPDM roofing membrane material has rapidly gained acceptance. The material is typically prepared by vulcanizing the composition in the presence of sulfur or sulfur containing compounds such as mercaptans or by using radiation cross linking promoters in the EPDM material which can be cured by ionizing radiation, for example, see U.S. Pat. No. 4,803,020, incorporated herein by reference.

Notwithstanding the usefulness of radiation curing and sulfur curing of a sheet of EPDM, a disadvantage of utilizing EPDM material is the lack of adhesion of cured EPDM to itself. Accordingly, it is usually necessary to splice the cured EPDM roofing membranes together with an adhesive to bond the cured EPDM membranes together to form a continuous EPDM membrane to cover the roof. It will be appreciated that the use of an adhesive for splicing cured EPDM membranes together requires that the adhesive and the resulting bond must meet a number of requirements which are extremely difficult to satisfy. The adhesive must provide sufficient seam peel and shear strength to permit the splice formed by bonding the cured EPDM membranes together to resist both the short-term and long-term stresses experienced by the spliced EPDM roofing membrane.

In view of the foregoing, it is an object of the present invention to provide a method and apparatus for selectively curing only the field of a sheet of EPDM. It is another object of the present invention to provide a method and apparatus for selectively curing only the field of a sheet of EPDM with radiation, preferably infrared radiation, and to a method of joining at least two selectively cured EPDM membranes to form a larger membrane. Yet another object of the present invention is to provide a method of splicing selectively cured EPDM membranes having a cured field and uncured longitudinal edge area which eliminates the need for a solvent based or non-solvent based splicing adhesive along the overlapping edge area and the related labor and hardware necessary for mixing and application thereof. It is another object of the present invention to provide a method and apparatus for curing only the field of a sheet of EPDM that is simple and economical.

SUMMARY OF THE INVENTION

Briefly, according to the present invention there is provided a method and apparatus for selectively curing a sheet of EPDM to form a roofing membrane for installation on a roof deck. The method includes the steps of providing a sheet formed of ethylene-propylene diene termonomer, the sheet having a field and longitudinal edge portions bordering the field. The field is defined by a planar surface portion exclusive of the longitudinal edge portions. The longitudinal edge portions are defined by the extent of overlap of adjacent roofing membranes when installed on a roof deck. The sheet is then selectively cured such that at least only the field is cured thereby leaving at least one longitudinal edge portion of the sheet uncured.

The apparatus for selectively curing a sheet of ethylene-propylene diene termonomer (EPDM) defined by a field and longitudinal edge areas bordering the field includes a curing oven, a radiation source and at least one screen. The curing oven has a roof and a floor interconnected by sidewalls, a front end and a back end. The front end includes an entrance and the back end includes an exit. A conveyor is positioned between the front end and the back end of the curing oven for continuously conveying the sheet of EPDM through the curing oven. The radiation source is located above the conveyor within the curing oven. At least one screen operatively projects from each sidewall of the curing oven and extends the longitudinal length of the curing oven to cover at least one edge area of the sheet and shield the edge area of the sheet of EPDM as the sheet passes through the curing oven under the radiation source.

The resulting roofing membrane from the process of the present invention is a sheet formed of ethylene-propylene diene termonomer. The sheet has a field defined by a cured planar surface portion and at least one noncured longitudinal edge area bordering the field and defined by the extent of overlap of adjacent roofing membranes when installed on a roof deck.

The selectively cured sheets of EPDM membrane may be joined by providing at least two sheets formed of ethylene-propylene diene termonomer, the sheets having a field defined by a cured planar surface portion and at least one noncured longitudinal edge area bordering the field defined by the extent of overlap of adjacent roofing membranes when installed on a roof deck. The noncured edge areas of two EPDM roofing membranes are then overlapped and pressed together and then the edge areas are vulcanized to splice the edge areas together.

BRIEF DESCRIPTION OF THE DRAWINGS

Further features and other objects and advantages of this invention will become clear from the following detailed description made with reference to the drawings in which.

DETAILED DESCRIPTION OF THE PREFERRED EMBODIMENTS

Figure 1:
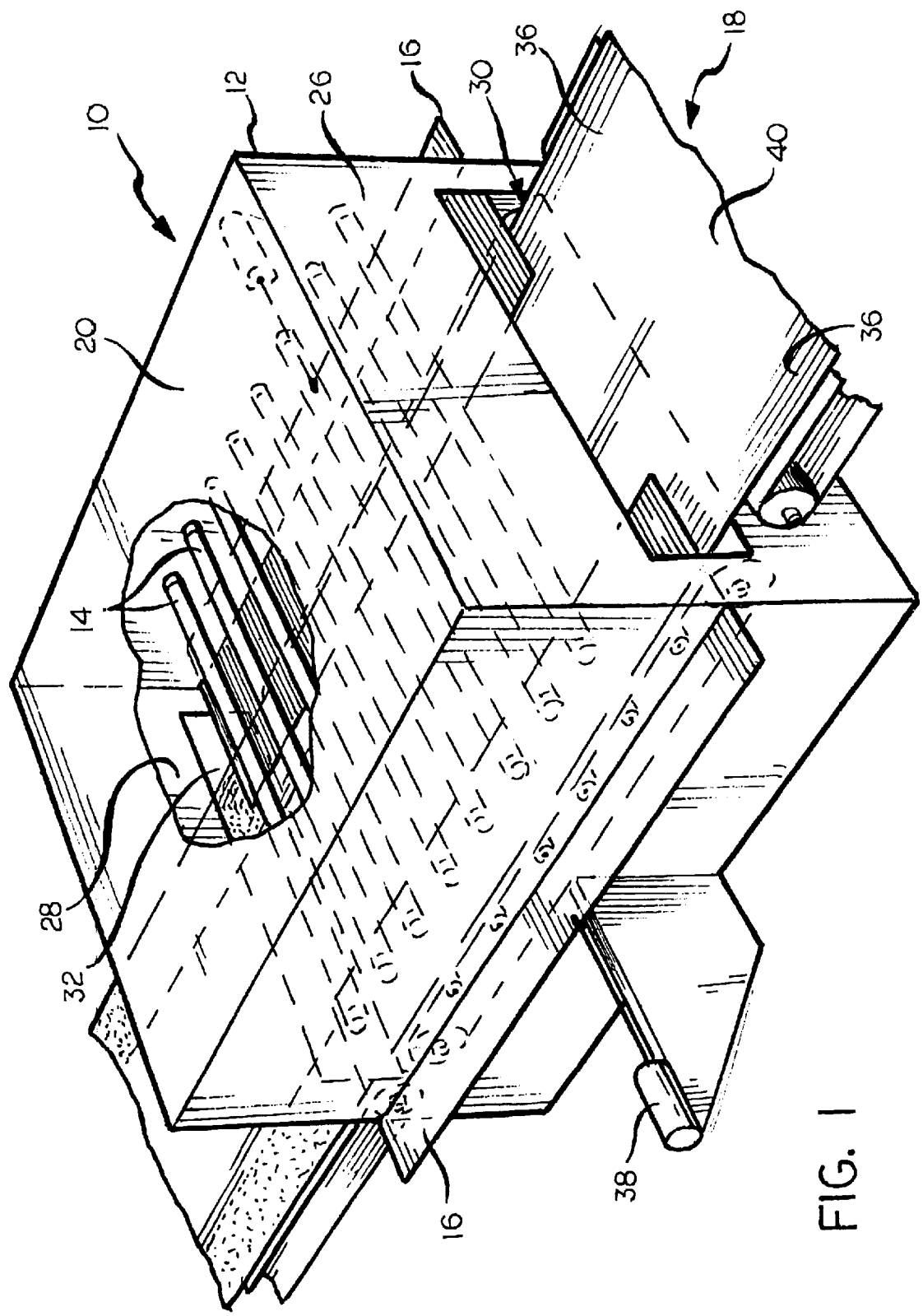
FIG. 1 is a perspective view of the apparatus for selectively curing a sheet of EPDM.

Referring to the figures, wherein like reference characters represent like elements there is shown an apparatus for selectively curing a sheet of EPDM to form a roofing membrane for installation on a roof deck. The sheet includes a field and longitudinal edges bordering the field. The term "field" refers to the planar surface center area of the sheet of EPDM that is adjacent the longitudinal edge area of the membrane that forms the splice. It will be appreciated that the longitudinal edge area that forms the splice may extend 2–3 inches from the edge of the sheet of EPDM. The term "EPDM" is intended to mean a terpolymer of ethylene-propylene and diene monomer. Illustrative methods for preparing such terpolymers are found in U.S. Pat. No. 3,280,082, the disclosure of which is incorporated herein by reference. The preferred polymers have from about 60 to about 95 weight percent ethylene and from about 0 to about 12 weight percent, preferably about 4 to about 6 weight percent of the diene with the balance of the polymer being propylene or some other similar olefin type polymer.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hemadiene, 1,5.hexadiene, 1,4-heptadiene, 2-methyl-1,5-hexadiene, cyclooctadiene, 1,4-octadiene, 1,7-octadiene, 5-ethylidene-2-nor-bornene, 5-n-propylidene-2-norbornene, 5-(2-methyl-2-butenyl)-2-norbornene and the like. A typical EPDM is Vistalon® MD-744 (Exxon Chemical Co.) a terpolymer having a Mooney Viscosity (ML/4 at 125° C.) of about 52; an ethylene/propylene (E/P) ratio of 61/39 weight percent and about 2.7 weight percent of unsaturation.

Particularly useful and preferred in preparing a sulfur curable EPDM composition is Royalene® 3180 (Uniroyal Chemical Co.) which has a Mooney Viscosity (ML/4 at 120° C.) of about 54; an ethylene/propylene ratio of about 67/33 weight percent; about 2.2 weight percent of unsaturation (5-ethylidene-2-norbornene); about 2.7 percent by weight of crystallinity and a weight average molecular weight of approximately 313,000 to 355,000. Also useful are thermoplastic heat seamable sheeting materials, i.e., EPDM's having a high degree of crystallinity as opposed to amorphous (non-crystalline) EPDM's. Examples thereof include Royalene® 375 (Uniroyal Chemical Co.); and EPsyn® 5508.

The composition employed to form the sheeting material comprises 100 parts by weight of EPDM or other similar olefinic type polymers, including mixtures of two or more types, to which are added fillers and processing materials as well as curatives as well known in the art. The curatives include, for example, organic polyamines, organic polyacids, organic polyesters, organic polyanhydrides, organic polysulfides and precursors thereof.

With respect to the fillers, suitable fillers are selected from the group consisting of reinforcing and non-reinforcing materials, and mixtures thereof, as are customarily added to rubber. Examples include such materials as carbon black, ground coal, calcium carbonate, clay, silica, cryogenically ground rubber and the like. Preferred fillers include carbon black, ground coal and ground recycled rubber or cryogenically ground rubber. Carbon black is used in an amount of about 20 parts to about 300 parts per 100 parts of polymer (phr), preferably about equal to the amount or carbon black normally used in preparing sulfur cured EPDM roof sheeting. The carbon black useful herein is any carbon black. Preferred are furnace blacks such as GPF (general purpose furnace), FEF (fast extrusion furnace) and SRF (semi-reinforcing furnace).

The ground coal employed as a filler in the compositions of the invention is a dry, finely divided black powder derived from a low volatile bituminous coal. The ground coal has a particle size ranging from a minimum of 0.26 microns to a maximum of 2.55 microns with the average particle size of 0.69±0.46 as determined on 50 particles, using Transmission Electron Microscopy. The ground coal produces an aqueous slurry having a pH of about 7.0 when tested in accordance with ASTM D-15 12.A preferred ground coal of this type is designated Austin Black which has a specific gravity of 1.22±0.03, an ash content of 4.58% and a sulfur content of 0.65%. Austin Black is commercially available from Coal Fillers, Inc., P.O. Box 1063, Bluefield, Va. Amounts range from about 5 to 65p~ with about 15 to 35 being preferred.

Finally, essentially any ground recycled rubber may be employed as a filler in the composition of the invention. The preferred ground recycled rubbers are cryogenically ground EPDM, butyl, neoprene and the like. A preferred cryogenically ground rubber is a cryogenically ground EPDM rubber. The preferred cryogenically ground EPDM rubber is a fine black rubbery powder having a specific gravity of 1.129±0.015 and a particle size ranging from about 30 to about 300 microns with an average particle size ranging from about 50 to about 80 microns. Amounts range from about 5 to 40 phr with about 10 to 25 phr being preferred.

Mixtures of Austin black and cryogenically ground rubber useful herein may be utilized as a partial replacement for carbon black. Where mixtures of these two fillers are employed the relative amounts thereof can be widely varied; the overall total not exceeding about 60 phr. The ratio of Austin black to cryogenically ground rubber may range from a desired ratio of 2:1 to perhaps even a ratio of 3:1. Again, as noted hereinabove, other filler materials can be employed. Amounts of these filler materials fall within the range of amounts normally employed in preparing sulfur cured conventional roof sheeting.

With respect to the processing material, it is included to improve the processing behavior of the composition (i.e. reduce mixing time and increase rate of sheet forming and includes processing oils, waxes and the like). The processing oil is included in an amount ranging from about 20 parts to about 150 parts process oil per 100 parts EPDM ingredient phr, preferably in an amount ranging from about 60 to about 100 phr. A preferred processing oil is a paraffinic oil, e.g. Sunpar 2280 which is available from the Sun Oil Company. Other petroleum derived oils including naphtheuic oils may be used.

Optional ingredients include, for example, other elastomers (e.g., butyl elastomer, neutralized sulfonated EPDM, neutralized sulfonated butyl) in place of minor amounts of the EPDM, secondary inorganic fillers (e.g., talc, mica, clay, silicates, whiting) with total secondary filler content usually ranging from about 10 to about 150, about 0.3 to 2 phr. It is a feature of the present invention that the roof sheeting compound is selectively cured prior to application.

The compounding ingredients can be admixed, utilizing an internal mixer (such as a Banbury mixer), an extruder, and/or a two-roll mill, or other mixers suitable for forming a viscous relatively uniform admixture. When utilizing a type B Banbury internal mixer, in a preferred mode, the dry or powdery materials such as carbon black are added first followed by the liquid process oil and finally the polymer (this type of mixing can be referred to as an upside-down mixing technique).

The resulting admixture is continuously sheeted to a thickness ranging from 5 to 200 mils, preferably from 35 to 60 mils, by conventional sheeting methods, for example, milling, calendering or extrusion. Preferably, the admixture is sheeted to at least 40 gauge (0.040 inches) which is the minimum thickness specified in standards set by the Roofing Council of the Rubber Manufacturers Association for non-reinforced black EPDM rubber sheets for use in roofing applications. In many cases, the admixture is sheeted to 40–45 gauge thickness since this is the thickness for a large percentage of "single-ply" roofing membranes used commercially.

Figure 2:
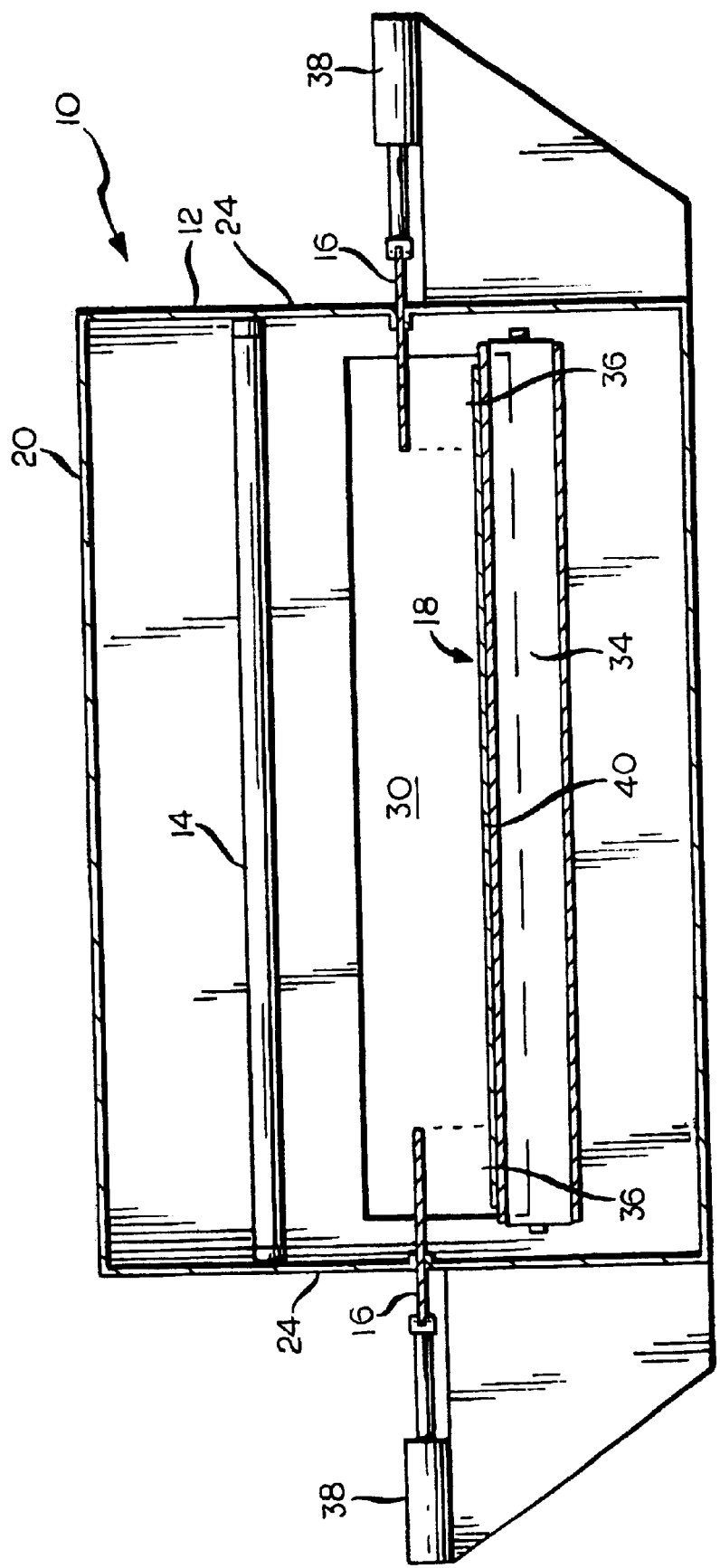
FIG. 2 is an end view of the apparatus of FIG. 1.
Figure 3:
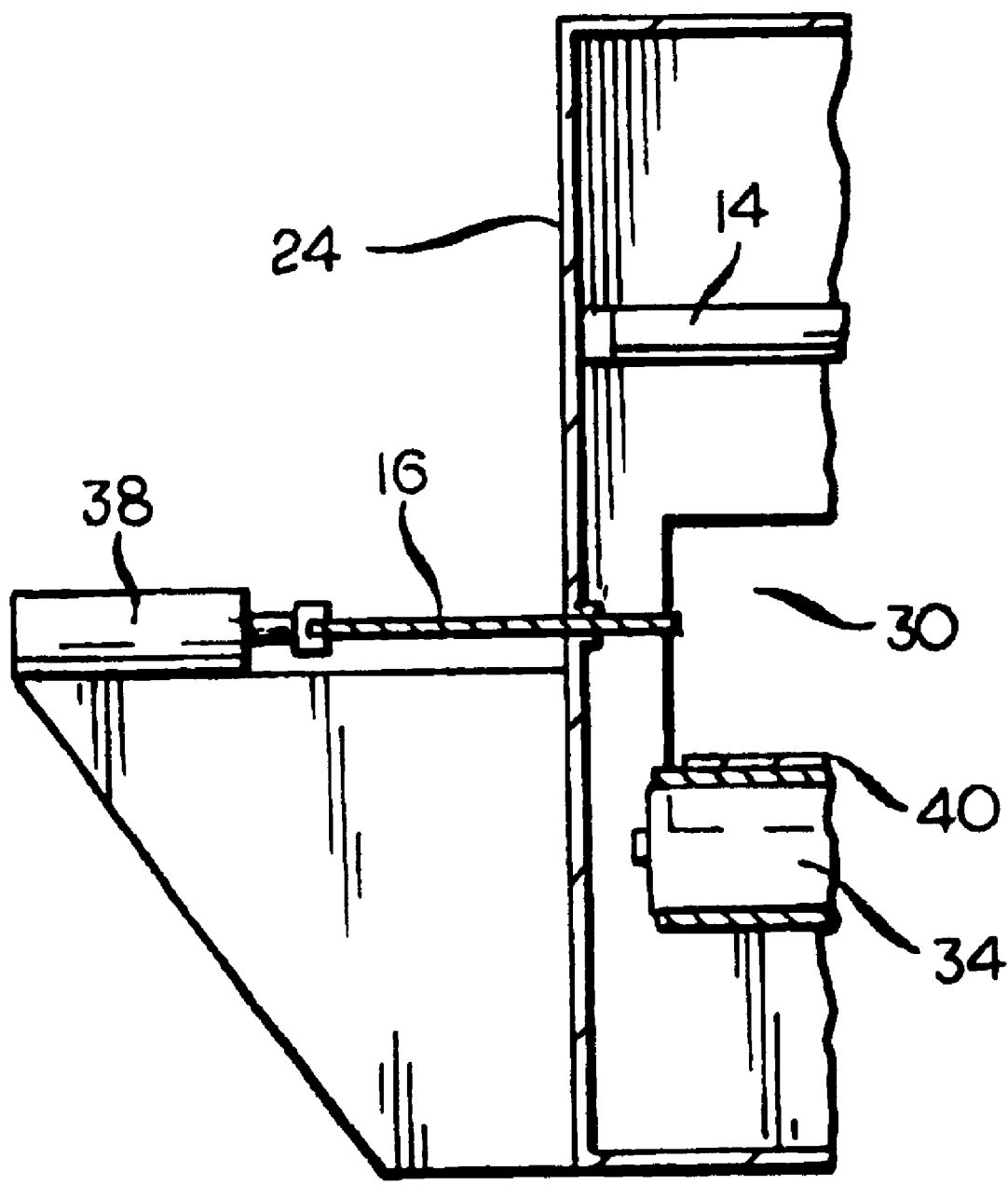
FIG. 3 is a partial end view of the apparatus of FIG. 1.

Referring to FIGS. 1–3, the apparatus 10 includes a curing oven 12 having a radiation source 14 and at least one screen 16. It will be appreciated that most any suitable curing oven design may be used to selectively cure at least the field of a sheet 18 of EPDM. The curing oven 12 may be formed of most any suitable material to withstand the high temperatures experienced in the curing oven. In a preferred embodiment, the curing oven 12 includes a means to continuously convey the sheet 18 of EPDM through the oven, a radiation source 14 and a screen 16 to shield at least a portion of the radiation from the sheet 18 of EPDM.

The apparatus 10 includes a curing oven 12 having a roof 20 and a floor 22 interconnected by sidewalls 24, a front end 26 and a back end 28. The front end 26 of the curing oven 12 includes an entrance 30 and the back end 28 of the curing oven includes an exit 32. Positioned between the front end 26 and the back end 28 of the curing oven 12 is an endless conveyor 34 of a type well known in the art for continuously conveying the sheet 18 of EPDM through the curing oven. Operatively projecting from each sidewall 24 of the curing oven 12 is at least one screen 16. The screen 16 may extend the longitudinal length of the curing oven 12 or a plurality of screens may project from each sidewall to form a continuous shield as further described herein. The screen 16 is a flat, rectangular shape radiation reflective material of a type well known in the art to cover the edge area 36 of the sheet 18 of EPDM forming the splice. The screen 16 acts to shield the edge area 36 of the sheet 18 of EPDM as the sheet passes through the curing oven 12 under the radiation source 14. In a preferred embodiment, the curing oven 12 includes an actuating member 38 to operatively position the screen 16 between an extended position over the edge area 36 of the sheet 18 of EPDM as shown in FIG. 1 to a retracted position as shown in FIG. 3. The actuating member 38 includes a piston member and an arm attached to the screen. However, it will be appreciated that the actuating member 38 may be most any suitable mechanical linkage of a type well known in the art to move the screen 16 from an extended position to a retracted position and back.

Located above the conveyor 34 within the curing oven 12 is a radiation source 14. The radiation source 14 provides a desired dose of high-energy radiation to cure at least the exposed field 40 of the sheet 18 of EPDM. Typically, useful high-energy sources of radiation include infrared radiation, gamma rays, x-rays, beta rays and the like. In a preferred embodiment, the radiation source 14 includes an array of infrared heat lamps of a type well known in the art located above the conveyor 34 within the curing oven 12. The intensity of the high energy radiation must be sufficient to cross-link the polymers within the sheet 18. Preferably, the intensity of the high energy radiation must be such that that the surface temperature of the sheet 18 is at least about 204° C.

In operation, the sheet 18 of EPDM is conveyed from a roller head die extruder 42 or similar device to manufacture the sheet, to the curing oven 12. The sheet 18 of EPDM then enters the entrance 30 of the front end 26 of the curing oven 12 and is conveyed through the curing oven beneath the radiation source 14. At least one, and preferably two, of the screens 16 are positioned above the edge areas 36 of the sheet of EPDM to shield the area. The radiation source 14 continuously cures at least the field 40 of the sheet 18 of EPDM as the sheet is conveyed through the curing oven 12. The selectively cured sheet 18 of EPDM exits the back end 28 of the curing oven 12 to a take-up roll as well known in the art.

The selectively cured sheet 18 of EPDM forming a roofing membrane may be spliced together by overlapping and pressing the noncured edge areas 36 of two EPDM roofing membranes together and then vulcanizing the edge areas to splice the edge areas together. It will be appreciated that by selectively curing at least the field 40 of the sheet 18 of EPDM, the EPDM roofing membranes may be spliced together without using an adhesive.

The patents and documents described herein are hereby incorporated by reference.

Having described presently preferred embodiments of the invention, the invention may be otherwise embodied within the scope of the appended claims.

What is claimed is:

1. A method for selectively curing a sheet of ethylene-propylene diene termonomer (EPDM) material to form a roofing membrane for installation on a roof deck comprising the steps of:

provide a sheet formed of ethylene-propylene diene termonomer, the sheet having a field and two longitudinal edge areas bordering the field;

providing a screen of radiation reflective material;

positioning the screen over an area of the field adjacent at least one edge of the EPDM sheet; and exposing at least the field to a source of radiation to cure at least the field of the EPDM sheet and provide a selectively cured EPDM roofing membrane.

2. The method of claim 1 wherein the sheet is provided by milling, calendering or extrusion.

3. The method of claim 1 wherein the sheet is from 5 to 200 mils thick.

4. The method of claim 1 wherein two longitudinal edge areas of the EPDM sheet are shielded.

5. The method of claim 1 wherein the at least one longitudinal edge area of the EPDM sheet is shielded by operatively projecting at least one screen over the at least one longitudinal edge area of the sheet and shielding the edge area of the sheet of EPDM.

6. The method of claim 1 wherein two longitudinal edge areas of the EPDM sheet are shielded by operatively projecting a screen over each longitudinal edge area of the sheet thereby shielding the edge area of the sheet of EPDM.

7. The method of claim 1 wherein the source of radiation is infrared radiation.

8. A roofing membrane comprising:

a sheet formed of ethylene-propylene diene termonomer (EPDM) material, the sheet having a field defined by a cured planar surface portion and a noncured longitudinal planar edge area bordering the cured planar surface portion and defined by the extent of overlap of adjacent roofing membranes when installed on a roof deck.

* * * * *